United States Patent [19]

Resnick

[11] Patent Number: 5,338,608
[45] Date of Patent: Aug. 16, 1994

[54] AMORPHOUS COPOLYMERS OF TWO FLUORINATED RING MONOMERS

[75] Inventor: Paul R. Resnick, Wilmington, Del.

[73] Assignee: E. I. du Pont de Nemours and Company, Wilmington, Del.

[21] Appl. No.: 149,403

[22] Filed: Nov. 9, 1993

Related U.S. Application Data

[62] Division of Ser. No. 65,044, May 24, 1993, which is a division of Ser. No. 878,481, May 5, 1992, Pat. No. 5,276,121.

[51] Int. Cl.$^5$ .................. B05D 5/00; B32B 17/02; B32B 17/10; B32B 33/00; G11B 5/255; G11B 5/72

[52] U.S. Cl. .................. 428/392; 360/110; 360/134; 360/135; 427/96; 427/127; 427/162; 427/164; 427/165; 428/203; 428/422; 428/908.8; 428/922

[58] Field of Search .................. 428/422, 392, 908.8, 428/922

[56] References Cited

U.S. PATENT DOCUMENTS

| 3,978,030 | 8/1976 | Resnick | 526/247 |
| 4,754,009 | 6/1988 | Squire | 526/247 |
| 4,897,457 | 1/1990 | Nakamida et al. | 526/247 |
| 5,276,121 | 1/1994 | Resnick | 526/247 |

FOREIGN PATENT DOCUMENTS 4-255716  9/1992  Japan .

Primary Examiner—James C. Cannon
Attorney, Agent, or Firm—Edwin Tocker

[57] ABSTRACT

Copolymers of perfluoro(1,3-dimethyl-2,2-dioxole) with perfluoro(butenyl vinyl ether) and, optionally, with a third comonomer are amorphous in all monomer proportions, and soluble in perfluoro(2-butyl tetrahydrofuran). These copolymers are suitable in many high technology applications, especially where solubility is important, e.g., in applying coatings to substrates or articles for protection against mechanical, chemical, or environmental hazards. Dipolymers of the present invention have lower glass transition temperatures than dipolymers of perfluoro(1,3-dimethyl-2,2-dioxole) with tetrafluoroethylene having the same monomer proportions.

1 Claim, 3 Drawing Sheets

AMORPHOUS COPOLYMERS OF TWO FLUORINATED RING MONOMERS

CROSS-REFERENCE TO RELATED APPLICATIONS

This is a divisional of my copending application Ser. No. 8/065,044, filed May 24, 1993, which is a divisional of my application Ser. No. 07/878,481, filed May 5, 1992, now U.S. Pat. No. 5,276,121.

FIELD OF THE INVENTION

This invention is in the field of amorphous perfluoropolymers which are particularly suitable for use in many high technology applications such as, for example, cladding materials for optical fibers, encapsulating materials for electronic components, substrates for laminates of all kinds, including electronic circuit boards, as well as in coatings, molded articles and films, especially pellicles.

BACKGROUND OF THE INVENTION

U.S. Pat. No. 3,978,030 to Resnick describes certain polymers of perfluoro-2,2-dimethyl-1,3-dioxole (PDD), which has the following formula (1):

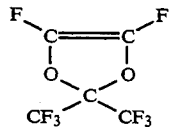

The above patent describes both homopolymers of PDD, which are not further characterized, and a crystalline copolymer with tetrafluoroethylene (TFE), which has a melting point of about 265° C.

Since Resnick's discovery of PDD homopolymer, it has been established that the material is amorphous and has a very high glass transition temperature, $T_g$, of about 335° C. The homopolymer, however, is brittle and difficult to fabricate into final products because of poor melt flow and low solubility in available solvents.

U.S. Pat. No. 4,530,569 to Squire describes amorphous dipolymers of PDD with TFE as well as terpolymers of PDD with TFE and another comonomer. U.S. Pat. Nos. 4,935,477 and 4,754,009, both to Squire, describe dipolymers and terpolymers (collectively, copolymers) of PDD with comonomers, which include, i.a., certain perfluoroolefins and perfluoro(alkyl vinyl ethers). It is shown in those patents that, in general, the $T_g$ of those copolymers decreases with increasing comonomer content, although not necessarily in a linear fashion. For a dipolymer containing 10 mole % of TFE, $T_g$ is decreased to about 260° C. Generally speaking, if the PDD content in those copolymers is less than about 12 mole %, those copolymers have some crystallinity, which normally is not desirable. While the amorphous copolymers are soluble at room temperature in perfluoro(2-butyl tetrahydrofuran) available from 3M Company as FLUORINERT® FC-75, their solubility is not high. For example, a dipolymer with 10 mole % of TFE has a solubility of less than 3 weight percent in this solvent. This, naturally, imposes some restrictions on the fabrication techniques which require application of copolymer from solution, for example, dip-coating or spray-coating.

U.S. Pat. No. 4,897,457 to Nakamura et al. describes amorphous homopolymers and copolymers containing either one of the following repeating cyclic structures (2) or (3)

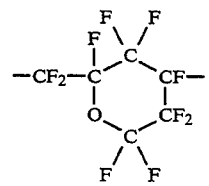

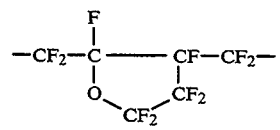

formed during the cyclic polymerization of perfluoro(butenyl vinyl ether) (PBVE), CF2=CF—OCF2CF2CF=CF2. The homopolymer has a $T_g$ of only about 108° C. Those polymers are soluble in perfluorobenzene as well as in FLUORINERT® FC-75. Comonomers disclosed appeared to reduce the $T_g$. Moreover, the patent states that copolymers with either fluoroolefins or vinyl ethers lose transparency, solvent-solubility, and mechanical strength if the repeating units (2) or (3) constitute less than 80 wt % of the polymer.

It appears, however, that copolymerization of PDD with PBVE, if successful, could lead to new materials having potentially useful properties.

SUMMARY OF THE INVENTION

According to this invention, there is now provided an amorphous copolymer of 1–99.5 mole % of perfluoro(2,2-dimethyl-1,3-dioxole) with a complementary amount of 99–0.5 mole % of at least one other comonomer, said copolymer being selected from the group consisting of dipolymers with perfluoro(butenyl vinyl ether) and terpolymers with perfluoro(butenyl vinyl ether) and with a third comonomer, wherein the third comonomer can be (a) a perhaloolefin in which halogen is fluorine or chlorine, but at least one half of the halogen atoms must be fluorine, or (b) a perfluoro(alkyl vinyl ether); the amount of the third comonomer, when present, being at most 40 mole % of the total composition. There also are provided various articles made from such a copolymer.

DETAILED DESCRIPTION OF THE INVENTION

Figure 1:
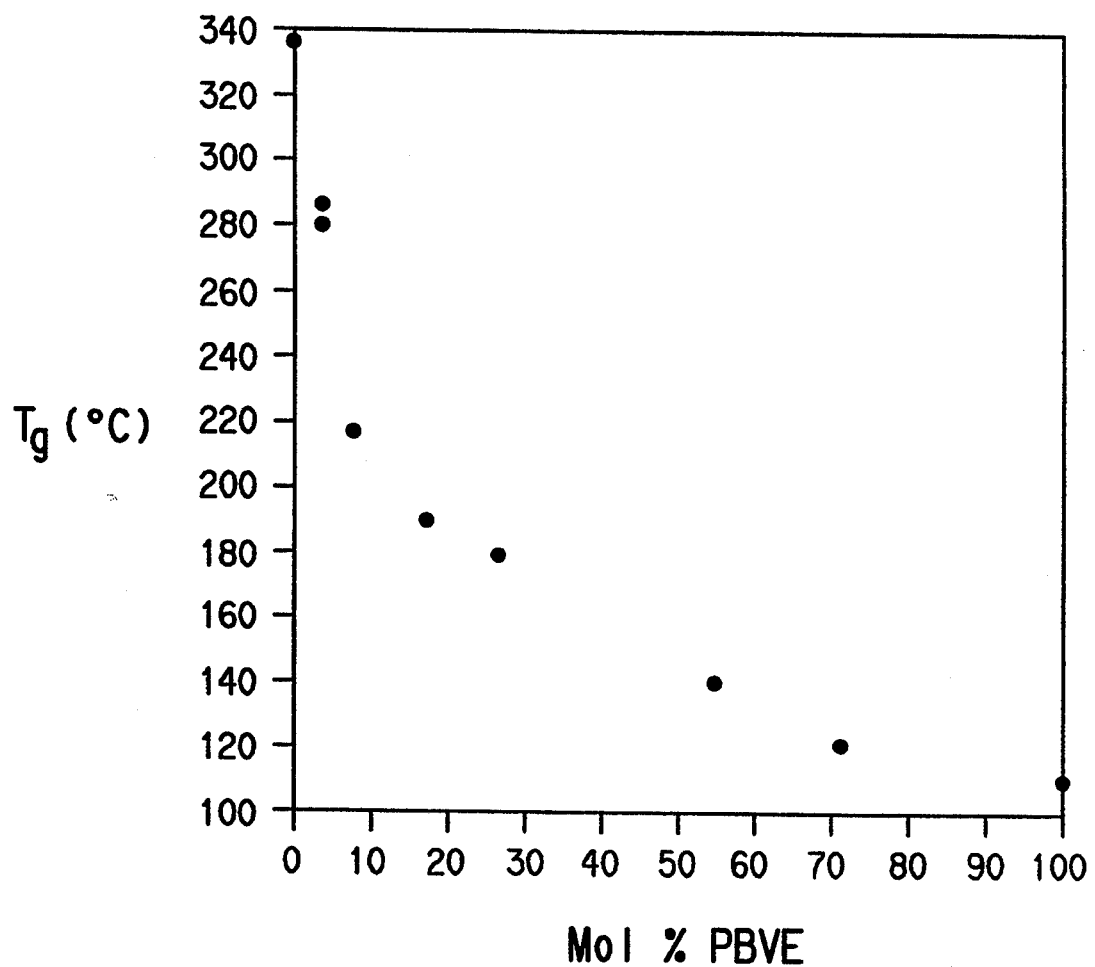
FIG. 1 is a plot of $T_g$ values for seven PDD/PBVE dipolymers versus the mole fraction of PBVE in the polymer.

Dipolymers of PDD and PBVE are amorphous in all proportions of comonomers. They have a good optical clarity and a low refractive index. $T_g$ varies with composition. Generally, preferred copolymers have a $T_g$ of at least 120° C., especially at least 180° C., and particularly at least 200° C. For the dipolymer, the corresponding minimum amounts of PDD are 30, 80, and 90 mole %. An especially surprising feature of the amorphous dipolymers of the present invention is that, compared with amorphous dipolymers of PDD with TFE having similar $T_g$ values, they are much more soluble in FLUORINERT ® FC-75.

The presence of a third comonomer in the copolymers of the present invention will of course affect many copolymer properties, including lowering of the copolymer's $T_g$, but it can also introduce undesirable crystallinity if present in a large amount, especially when the third comonomer is a perhaloolefin. Perfluoro(alkyl vinyl ether) comonomers, on the other hand, tend to decrease both the flexural modulus of copolymer and its $T_g$.

All the amorphous copolymers of the present invention are high molecular weight, film-forming materials.

The principal monomers used in this invention are known to the art. PDD is described in the above-mentioned U.S. Pat. No. 3,978,030. PBVE is described in the above-mentioned U.S. Pat. No. 4,897,457.

Representative comonomers that may be used in conjunction with PDD and PBVE include, i.a., TFE, chlorotrifluoroethylene, hexafluoropropylene, perfluoro(methyl vinyl ether), perfluoro(propyl vinyl ether), perfluoro(ethyl vinyl ether), which are described in the above-mentioned U.S. Pat. No. 4,935,477. Preferred such comonomers are chlorotrifluoroethylene and TFE.

Copolymerization of PDD and PBVE is carried out in the presence of a free radical generator at a temperature suitable for the initiator chosen. Well agitated pressure equipment and a nontelogenic solvent or diluent should be used, preferably one that has sufficient volatility to permit easy removal from the polymer. Polymerization methods may include solution polymerization, suspension polymerization, and emulsion polymerization including emulsion polymerization in the presence of a solvent. All those copolymerization techniques are well known and some have been described in the above-mentioned Resnick and Squire patents, which are herein incorporated by reference. It often will be practical to further thermally stabilize the copolymer by any suitable technique, including, for example, fluorination, described in Buckmaster et al., U.S. Pat. No. 4,675,380, and a process described by Bekiarian et al. in U.S. Pat. No. 4,946,902, which involves initial treatment with an organic amine or with a tertiary alcohol, isolation of the intermediate formed, and fluorination of the intermediate.

$^{19}$F-Nuclear magnetic resonance spectroscopy (NMR) can be used to establish the presence of a cyclic structure derived from PBVE in the polymer, while infrared absorption spectroscopy is useful for ascertaining that there is no C=C residue from the PBVE; that is, that both double bonds in PBVE have reacted. These procedures are explained in the above-cited patent to Nakamura et al.

When the correct structure of the PBVE-derived rings is known, the relative proportions of PDD and PBVE comonomers in the dipolymer can be readily determined by $^{19}$F-NMR. A paper presented by Asahi Glass scientists (K. Ooharu et al. ) at the 16th Symposium on Fluorine Chemistry, Japan Chemical Society, Nagoya, Oct. 28–29, 1991, New Fluoropolymer Obtained by Cyclopolymerization, provides some details of the structure of the homopolymer, which is said to be 100% that represented herein as formula (3). For the purpose of determining the relative proportions of the comonomers in the copolymer, $^{19}$F-NMR spectra of certain dipolymers of the present invention were interpreted on the assumption that the PBVE-derived ring was pentamembered.

The copolymers of the present invention will be useful in a number of applications, especially in such high technology areas as optical fibers, optical instruments and equipment, electronics, coatings, laminates, and extruded or molded shapes and articles, for example, for equipment exposed to a corrosive environment such as integrated circuit fabricating equipment. Generally speaking, all the end uses already disclosed or claimed for other dipolymers or terpolymers of PDD in the above-cited U.S. Pat. Nos. 4,530,569; 4,754,009; and 4,935,477, all assigned to E. I. du Pont de Nemours and Company; and all the end uses disclosed or claimed for PBVE polymers in various U.S. and Japanese patents and/or patent applications of Asahi Glass Company, including, e.g. U.S. Pat. Nos. 4,897,457 and 4,910,276 and Japanese unexamined patent applications 63/8/168936 (Kokai 2/19801)—"A low reflectance treatment agent"; 63/233399 (Kokai 2/84456)—"Adhesives for optical elements"; 63/293490 (Kokai 2/141210)—"Mold release agent"; and 1/142191 (Kokai 3/9367)—"Xerographic photoreceptor", would also be appropriate end uses for the copolymers of the present invention. However, because the principal advantage of the copolymers of the present invention over those disclosed in the above-cited Squire patents is their increased solubility in solvents such as FLUORINERT ® FC-75, the most important end uses of such copolymers will be those where solubility is important, e.g., in spray-coating, dip coating, and coating with a brush or with a roller. Such coatings may be applied, e.g., to electronic components such as capacitors, resistors, and integrated circuits, for the purpose of encapsulating them to protect them from harmful environment or to provide a highly dielectric layer; to plastic sheets or metal foils for the purpose of protecting them from damage or for making laminates; to interior walls of reactors, especially those employed in highly corrosive reactions with concentrated acids or with hydrofluoric acid, to protect them from corrosion; to light-transmitting devices such as optical lenses, prisms, and glazing to impart to them improved abrasion resistance or resistance against damage in corrosive environment; to glass or quartz cores for optical fibers to form a cladding; and to components of magnetic recording devices such as recording heads, disks, and tapes, and to components of radio and microwave receiving equipment such as antenna dishes etc. to protect them from mechanical or environmental damage.

This invention is now illustrated by means of the following examples, where all parts, proportions, and percentages are by weight unless otherwise indicated. All values of weight and measure that were not originally obtained in SI units have been converted to SI units. A table at the end of the examples, below, summarizes the experimental data.

$T_g$ was determined by DSC according to ASTM D-3418 using a Du Pont Differential Thermal Analyzer equipped with DSC Module 912. In all examples, the DSC curves showed only a second order transition and no first order transition, indicating the absence of crystallinity. The $T_g$ values obtained for the copolymers of seven of those examples, as well as for the corresponding homopolymers are plotted in FIG. 1 against mole percentages of PBVE.

Refractive index was determined by the procedure of ASTM D-542.

EXAMPLE 1

A stainless steel shaker tube was charged with 200 ml of 1,1,2-trichloro-1,2,2-trifluoroethane (CFC-113), 24.4 g of PDD, 14.0 g of PBVE, and 3 ml of a 3% solution of perfluoropropionyl peroxide in CFC-113. After degassing at −40° C., the tube was heated and shaken for 4 hours at 35° C. and then for 1 hour at 60° C. The product consisted of a clear liquid and a gelatinous solid. After evaporation of volatile materials in a rotary evaporator at 60° C. and a pressure of 6.67 kPa, the white polymeric residue was dried under vacuum at 100° C. for 16 hours to yield 20 g of polymer. The polymer was pressed into a clear film at 275° C. The infrared spectrum for this film showed no olefinic absorption at 1783 cm$^{-1}$ and was consistent with a dipolymer of PDD with PBVE. The copolymer composition was shown by $^{19}$F-NMR to be 83.9 mole % PDD and 16.1 mole % PBVE. Its $T_g$ was 190° C. Refractive index was 1.3010, measured on the pressed film.

The copolymer was soluble to an extent of up to 8% by weight in FLUORINERT® FC-75 at ambient temperature. A 10% mixture with this solvent was very viscous and formed a solution only at a temperature of about 50° C. By comparison, a PDD/TFE dipolymer of U.S. Pat. No. 4,754,009 having such a high proportion of PDD would be much less soluble in FLUORINERT® FC-75. To achieve the same degree of solubility, a dipolymer of U.S. Pat. No. 4,754,009 would have to have an approximate composition of 70 mole % PDD and 30 mole % TFE, which would have a much lower $T_g$ of about 160° C.

A 6% solution of the dipolymer in FLUORINERT® FC-75 was painted onto a glass plate and air-dried. The plate was placed in boiling water where the film delaminated. The film was dried at 100° C. in a vacuum oven. Film thickness was about 0.013 mm. The infrared spectrum for this film showed the absence of C=C unsaturation in the 1780–1790 cm$^{-1}$ region.

Figure 2:
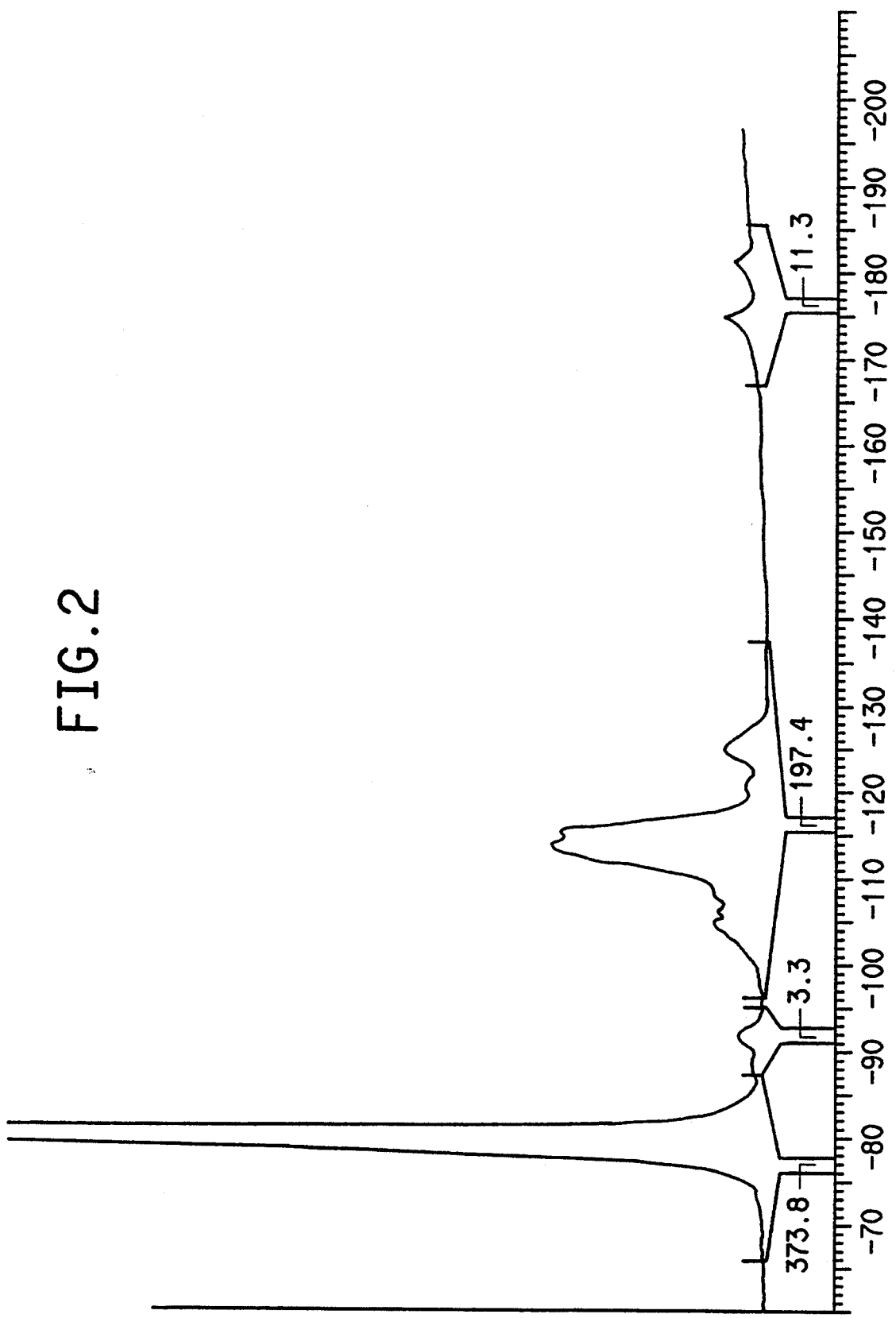
FIG. 2 is an $^{19}$F-nuclear magnetic resonance spectrum of a PDD/PBVE dipolymer composed of 83.9 mole % of PDD and 16.1 mole % of PBVE.

FIG. 2 is the $^{19}$F-NMR spectrum of this dipolymer. It shows three main regions: one at about −71 to −98 ppm, attributed to fluorine atoms in the CF$_3$ and OCF$_2$ groups; one at about −98 to −134 ppm, attributed to the fluorine atoms in OCF and CF$_2$ groups; and one at about −164 to −190 ppm, attributed to the fluorine atom in the CF group not adjacent to oxygen in the pentamembered cycle derived from PBVE. Calculation of the relative proportions of the comonomers in the copolymer is straightforward and is based on the peak areas.

EXAMPLES 2–8

The polymerization and polymer isolation procedures of Example 1 were repeated, except that the quantities of PDD and PBVE were varied, with no change in the amount of solvent or initiator. Monomer charges are summarized in the table below, along with measured composition and properties.

FIG. 1 summarizes in graphic form the $T_g$ values vs. dipolymer composition. The value for the comparison PDD homopolymer shown on this plot was found in this case to be 335° C., rather than 330° C. reported in U.S. Pat. No. 4,754,009. The value for the PBVE homopolymer has been taken from U.S. Pat. No. 4,897,457.

The decrease of $T_g$ caused by the addition of very small amounts of PBVE is very steep, as compared with the decrease caused by the addition of TFE, known from the above U.S. Pat. No. 4,754,009. Thus, the presence of 10 mole % of PBVE reduces the $T_g$ of the dipolymer to about 200° C., but the $T_g$ of a PDD/TFE dipolymer containing 10 mole % of TFE is known to be about 230° C.

The copolymer of Example 5 was soluble in FLUORINERT® FC-75 to form an 8% solution. A 10% mixture formed a clear gel.

Unlike the copolymers of U.S. Pat. No. 4,897,457 containing less than 80% of PBVE, the copolymers of the present invention remained amorphous and did not lose solvent solubility.

Figure 3:
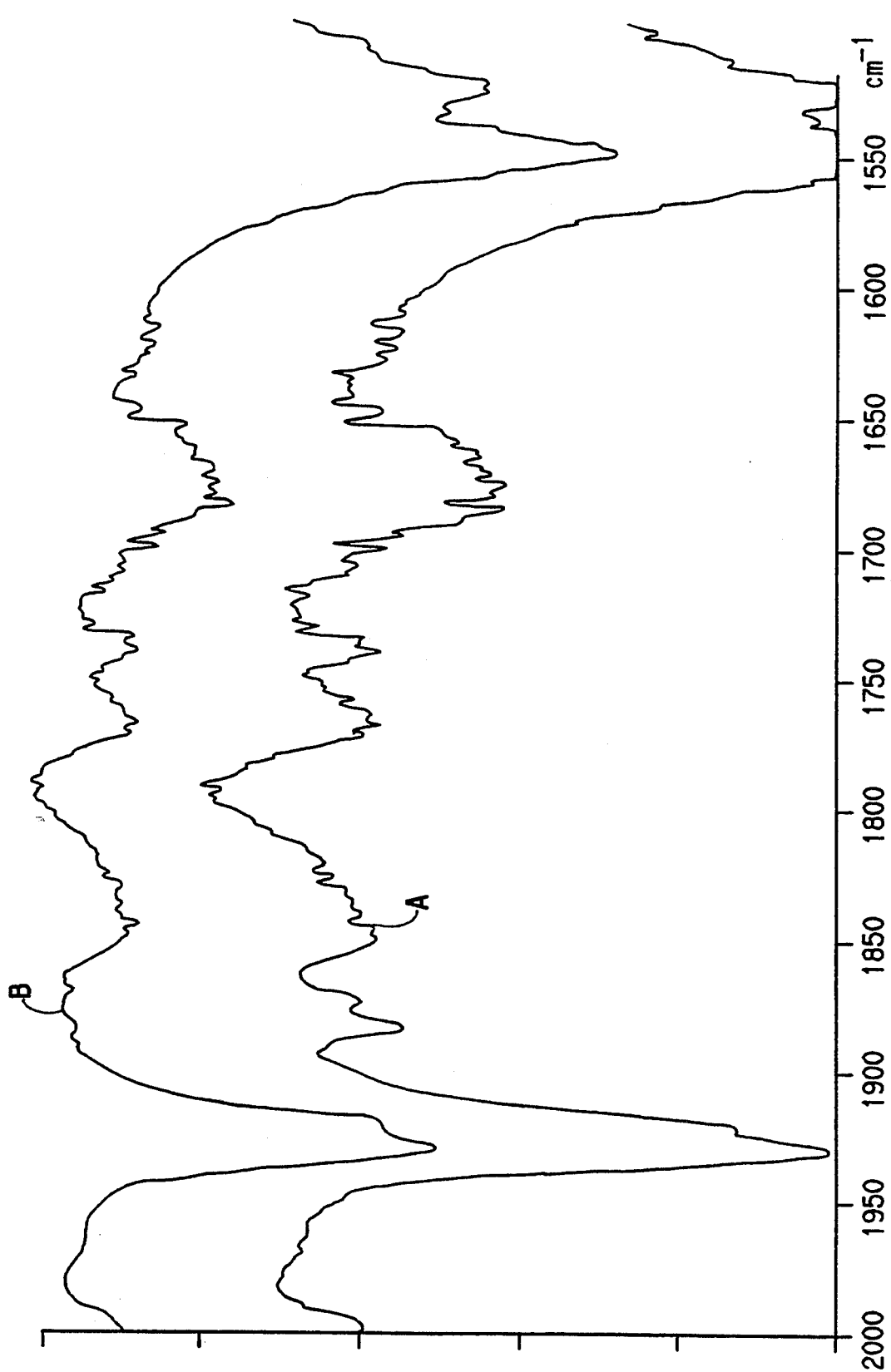
FIG. 3 is the infrared absorption spectrum of a PDD/PBVE dipolymer composed of 96.5 mole % of PDD and 3.5 mole % of PBVE, before and after stabilizing fluorination treatment.

A 15 g sample of the copolymer of Example 2 was subjected to a severe treatment with elemental fluorine for the purpose of removing unstable end groups, as follows. After evacuation, the fluorinating vessel was pressured to 1379 Pa with a mixture of 25 vol. % of fluorine and 75 vol. % of nitrogen. The sample was held in this atmosphere at the following time and temperature increments: 35° C. for 0.5 hour, 100° C. for 1 hour, 135° C. for 2 hours, and 200° C. for 4 hours. The vessel was then vented, repressured to 1379 Pa with the 25/75 vol. % fluorine/nitrogen mixture, and held at 200° C. for 4 additional hours. After this treatment, 14.1 g of a very clean white powder was recovered. $T_g$ after fluorine treatment was 266° C. A film pressed at 335° C. had the same infrared spectrum as before fluorine treatment except for the disappearance of small peaks at 1874 cm$^{-1}$ and 1884 cm$^{-1}$ attributable to the —COF end groups in the crude copolymer. Both spectra are shown in FIG. 3, where curve A was obtained before the fluorination and curve B after the fluorination.

TABLE

Summary of PDD/PBVE Dipolymer Examples 1–8

| Ex. | Monomer Charge (g) | | Polymer Properties | |
| --- | --- | --- | --- | --- |
| | PDD | PBVE | PBVE (mole %) | Tg(°C.) |
| 1 | 24.4 | 14.0 | 16.1 | 190 |
| 2 | 36.6 | 3.5 | 3.5 | 287 |
| 3 | 36.6 | 3.5 | 3.3 | 286 |
| 4 | 36.6 | 3.5 | 3.4 | 281 |
| 5 | 36.6 | 7.0 | 7.7 | 218 |
| 6 | 20.0 | 20.0 | 26.3 | 179 |
| 7 | 6.1 | 28.0 | 54.4 | 142 |
| 8 | 4.0 | 30.0 | 70.6 | 122 |

EXAMPLE 9

A stainless steel shaker tube was charged with 200 ml of CFC-113, 36.6 g of PDD, 3.5 g of PBVE, and 3 ml of a 3% solution of perfluoropropionyl peroxide in CFC-113. After degassing at −40° C., 5.0 g of chlorotrifluoroethylene (CTFE) was added and the tube was heated and shaken for 4 hr at 35° C. and then for 1 hr at 60° C. The product consisted of a clear liquid and a gelatinous solid. After evaporation of volatile materials, the white residue was dried under vacuum at 150° C. for 16 hours to give 20 g of polymer. The polymer was pressed into a clear film at 325° C. The infrared spectrum of this film showed no olefinic absorption at 1783 cm$^{-1}$ and was consistent with a terpolymer of PDD, PBVE, and CTFE. The $^{19}$F-NMR spectrum was consistent with a terpolymer containing 62.0 mole % of PDD, 2.2 mole % of PBVE, and 35.8 mole % of CTFE. It had a $T_g$ of 155° C.

I claim:

1. A light-transmitting device selected from the group consisting of lenses, windows, optical filters, and prisms, said device carrying on at least one surface thereof a coating of an amorphous copolymer of 1–99.5 mole % of perfluoro(2,2-dimethyl-1,3-dioxole) with a complementary amount of 99–0.5 mole % of at least one other comonomer, said copolymer being selected from the group consisting of dipolymers with perfluoro(butenyl vinyl ether) and terpolymers with perfluoro(butenyl vinyl ether) and with a third comonomer, wherein the third comonomer can be (a) a perhaloolefin in which halogen is fluorine or chlorine, but at least one half of the halogen atoms must be fluorine, or (b) a perfluoro(alkyl vinyl ether); the amount of the third comonomer, when present, being at most 40 mole % of the total composition.

* * * * *